(12) United States Patent
Kubo et al.

(10) Patent No.: US 8,557,929 B2
(45) Date of Patent: Oct. 15, 2013

(54) METHOD FOR PRODUCING BIODEGRADABLE POLYOXYALKYLENE DERIVATIVE

(75) Inventors: Kazuhiro Kubo, Kawasaki (JP);
Shigeru Kitano, Kawasaki (JP); Chika Ito, Kawasaki (JP)

(73) Assignee: NOF Corporation, Tokyo (JP)

( * ) Notice: Subject to any disclaimer, the term of this patent is extended or adjusted under 35 U.S.C. 154(b) by 971 days.

(21) Appl. No.: 11/863,977

(22) Filed: Sep. 28, 2007

(65) Prior Publication Data

US 2008/0081888 A1    Apr. 3, 2008

(30) Foreign Application Priority Data

Sep. 29, 2006  (JP) ................. 2006-269943

(51) Int. Cl.
*C08F 4/46* (2006.01)
*C08G 65/329* (2006.01)
(52) U.S. Cl.
USPC ........... 525/450; 528/488; 528/491; 528/366; 528/421; 528/403
(58) Field of Classification Search
USPC .................. 525/450; 528/488, 491
See application file for complete search history.

(56) References Cited

U.S. PATENT DOCUMENTS 5,164,111 A * 11/1992 Dorsch et al. ............ 252/299.01
5,410,016 A   4/1995 Hubbell et al.

FOREIGN PATENT DOCUMENTS

WO     97/22371 A1   6/1997
WO     00/62827 A2  10/2000

OTHER PUBLICATIONS

Zhang et al, Synthesis and characterization of the paclitaxel/MPEG-PLA block copolymer conjugate, Biomaterials, 26 (2005) pp. 2121-2128.*
Choi et al, Star-Shaped Poly(ether-ester) Block Copolymers: Synthesis, Characterization, and Their Physical Properties, Macromolecules, 1998, 31, 8766-8774.*

* cited by examiner

*Primary Examiner* — Randy Gulakowski
*Assistant Examiner* — Rachel Kahn
(74) *Attorney, Agent, or Firm* — Sughrue Mion, PLLC

(57) ABSTRACT

A method for producing a biodegradable polyoxyalkylene derivative, includes: reacting a biodegradable polyoxyalkylene compound represented by the formula (1) as defined herein with a compound represented by one of the formulae (I) to (IV) as defined herein in a presence of an alkaline solid salt, the biodegradable polyoxyalkylene derivative being represented by the formula (2) as defined herein.

7 Claims, No Drawings

METHOD FOR PRODUCING BIODEGRADABLE POLYOXYALKYLENE DERIVATIVE

FIELD OF THE INVENTION

This invention relates to a method for producing a biodegradable polyoxyalkylene derivative.

BACKGROUND OF THE INVENTION

In recent years, there have been found out a number of physiologically active proteins, polypeptides, synthetic compounds, compounds extracted from natural sources and so on. Thus, intensive studies have been made to apply these substances to medicines. Also, attempts have been made to develop drug delivery systems (DDSs) in order to improve the selective delivery of a physiologically active substance such as a drug to a target site while reducing its side effect. As these DDSs a method which comprises modifying a polypeptide in, for example, a protein preparation with a hydrophilic polymer such as polyethylene glycol and a method which comprises encapsulating a drug or the like in microparticles such as a polymer micelle are now under study. In these methods, use is made of a polymer into which a biodegradable unit such as a peptide or polylactic acid has been introduced not only for enhancing the drug retention in the blood but also for sustainedly releasing the drug at a target site.

Moreover, biodegradable polymers such as polylactic acid and polyglycolic acid have been widely employed in order to enzymatically or non-enzymatically hydrolyze a drug, which has been sustainedly released into the body, into nontoxic components followed by metabolism and absorption in vivo. More specifically speaking, these polymers, which form crosslinked polymers via gelation of multiple components, are employed in a drug release device, a suture thread/bone-fixing agent, a hemostatic agent, a tissue adhesion inhibitor and so on.

Known examples of these crosslinked polymers are as follows. That is, WO 97/22371 proposes a crosslinkable polymer composition to be used in preventing surgical adhesion, drug delivery and so on which comprises a mixture of a synthetic polypeptide or polyethylene glycol having a plural number of nucleophilic groups such as a primary amino group or a thiol group (—SH) with a hydrophilic or hydrophobic polymer having an electrophilic group such as a succinimidyl group.

Further, WO 00/62827 discloses a composition to be used as a hemostatic/adhesive material or a tissue adhesion inhibitor in vivo during a surgical operation which comprises a compound having a plural number of thiol groups (—SH) as a first component and a compound having a plural number of thiol-reactive groups as a second component, wherein at least one of the first and second components is a polyalkylene oxide and these components react with each other to form a gel. Into this composition, however, no biodegradable group such as polylactic acid is introduced.

Furthermore, U.S. Pat. No. 5,410,016 proposes a polymer compound prepared by introducing an oligo(polyhydroxy acid) such as polylactic acid or polyglycolic acid into a compound having four hydroxyl groups (α-, ω- and two hydroxyl groups on bisphenol A linker) in a bifunctional polyethylene glycol (α-, ω-) and a bifunctional polyethylene glycol attached to bisphenol A bisepoxide and then introducing an acrylic group to a terminus thereof.

SUMMARY OF THE INVENTION

To produce such a polyoxyalkylene derivative, it is generally possible without any difficulty to select a catalyst usable in the reaction of introducing a functional group unless the polymer contains a biodegradable unit. In the case where the polymer has a biodegradable unit, however, the selection of such a catalyst is restricted since the biodegradable unit might be cleaved by some catalysts. Moreover, there are some biodegradable units such as polylactic acid terminated with a secondary hydroxyl group. Compared with biodegradable units terminated with a primary hydroxyl group such as caprolactone or glycolic acid, these biodegradable units are poor in reactivity. To introduce various functional groups thereto, it is therefore highly important to select an appropriate catalyst.

As an example of a method of producing a polymer having a biodegradable unit, U.S. Pat. No. 5,410,016 as described above discloses a method which comprises reacting an oligo (polyhydroxy acid)-polyoxyalkylene with acryloyl chloride in the presence of triethylamine to thereby give an acryl-oligo (polyhydroxy acid)-polyoxyalkylene. However, this method suffers from a problem that the filtration of triethylamine hydrochloride formed as a by-product proceeds only extremely slowly and thus the by-product solidifies on the filter face due to cooling, which makes it impossible to continue the filtration any longer. Therefore, this method is unsuitable for industrial production. When the filtration is conducted at an elevated temperature, there arise some troubles such that the polymerization of acryloyl group is induced and the final product is contaminated with triethylamine hydrochloride eluted into the filtrate.

As discussed above, the existing methods of producing a polymer having a biodegradable unit are restricted in the selection of a catalyst and suffer from some problems such that a troublesome purification procedure is needed and the product is contaminated with impurities. Therefore, it has been required to develop a production method whereby a polymer having a biodegradable unit can be conveniently obtained on an industrial scale.

An object of the invention, which has been completed taking the above-described problems into consideration, is to provide a production method whereby a biodegradable polyoxyalkylene derivative can be conveniently obtained on an industrial scale by using a polyoxyalkylene compound terminated with an oligo(polyhydroxy acid).

To achieve the object as described above, the present inventors conducted intensive studies. As a result, they have found out that a biodegradable polyoxyalkylene derivative represented by the following formula (2) can be conveniently produced on an industrial scale without causing the above-described problems encountered in the prior art by performing a reaction of a biodegradable polyoxyalkylene compound represented by the following formula (I) with a compound represented by one of the formulae (I) to (IV) in the presence of a specific catalyst. The invention has been thus completed.

Accordingly, the invention is as follows.

[1] A method which comprises reacting a biodegradable polyoxyalkylene compound represented by the following formula (1) (hereinafter referred to as the compound (1)) with a compound represented by one of the following formulae (I) to (IV) (hereinafter referred to respectively as the compounds (I) to (IV)) in the presence of an alkaline solid salt to thereby give a biodegradable polyoxyalkylene derivative represented by the following formula (2) (hereinafter referred to as the compound (2)):

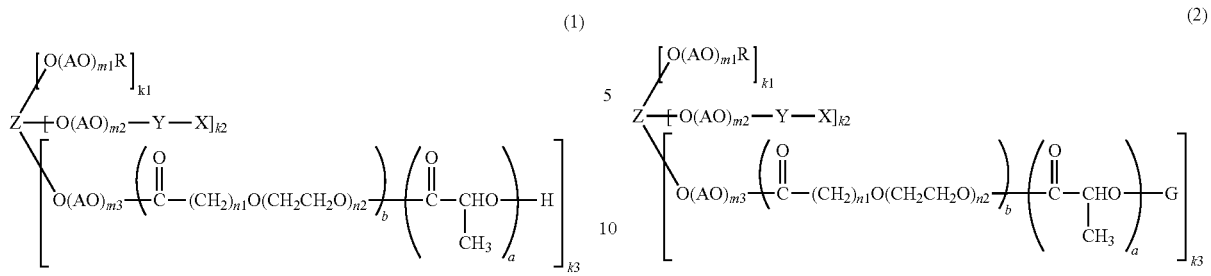

In the above formula, Z represents a residue of a compound having 2 to 10 hydroxyl groups; Y represents a single bond or a group selected from among an alkylene group having 1 to 6 carbon atoms, —C(=O)—, —C(=O)O—, —C(=O)(CH$_2$)$_p$— (wherein p satisfies the range of 1≤p≤5), —C(=O)(CH$_2$)$_q$C(=O)O— (wherein q is 2 or 3), —(CH$_2$)$_2$NHC(=O)(CH$_2$)$_2$— and —(CH$_2$)$_3$NHC(=O)(CH$_2$)$_2$—; X represents a group selected from among a carboxyl group, a maleimide group, a t-butoxycarbonylamino group and a 3,3-diethoxypropoxy group; R represents a hydrocarbon group having 1 to 6 carbon atoms, AO represents an oxyalkylene group having 2 to 4 carbon atoms; a and b respectively satisfy the ranges of 1≤a≤500 and 0≤b≤500; m1 and m2 are each independently 5 to 2000; m3 is 0 to 2000; n1 and n2 respectively satisfy the ranges of 1≤n1≤5 and 0≤n2≤1; and k1, k2 and k3 respectively satisfy the ranges of 0≤k1≤8, 0≤k2≤8 and 1≤k3≤10 and 2≤k1+k2+k3≤10.

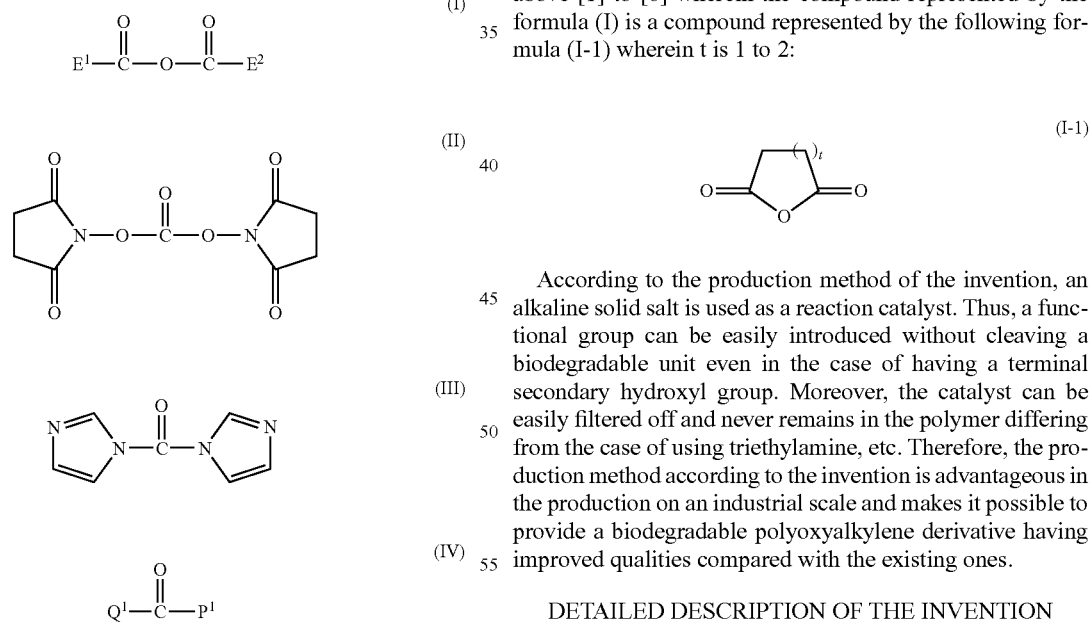

In the above formula, E$^1$ and E$^2$ represent each —(CH$_2$)$_r$Q$^2$ (wherein Q$^2$ represents a halogen atom and r is from 1 to 5), or E$^1$ and E$^2$ together form an alkylene group; P$^1$ represents a group selected from among a vinyl group, a 2-propenyl group, a p-nitrophenoxy group, a pentafluorophenoxy group, a benzotriazoloxy group, a succinimidyloxy group and —(CH$_2$)$_r$Q$^2$ (wherein Q$^2$ and r are each as defined above); and Q$^1$ represents a halogen atom.

In the above formula, Z, Y, X, R, AO, a, b, m1, m2, m3, n1, n2, k1, k2 and k3 are each as defined above; and G represents a residue originating in a compound represented by one of the above-described formulae (I) to (IV). In the case where k3 satisfies the range 2≤k3, at least one G may be a hydrogen atom,

[2] A production method as described in the above [1] wherein a satisfies the range 1≤a≤300 and b is 0.

[3] A production method as described in the above [1] or [2] wherein k1 is 0.

[4] A production method as described in any one of the above [1] to [3] wherein k2 is 0.

[5] A production method as described in the above [4] wherein k1 and k3 respectively satisfy the ranges of 1≤k1≤4 and 1≤k3≤2.

[6] A production method as described in any one of the above [1] to [5] wherein the alkaline solid salt is potassium carbonate or potassium acetate.

[7] A production method as described in any one of the above [1] to [6] wherein the compound represented by the formula (I) is a compound represented by the following formula (I-1) wherein t is 1 to 2:

(I-1)

According to the production method of the invention, an alkaline solid salt is used as a reaction catalyst. Thus, a functional group can be easily introduced without cleaving a biodegradable unit even in the case of having a terminal secondary hydroxyl group. Moreover, the catalyst can be easily filtered off and never remains in the polymer differing from the case of using triethylamine, etc. Therefore, the production method according to the invention is advantageous in the production on an industrial scale and makes it possible to provide a biodegradable polyoxyalkylene derivative having improved qualities compared with the existing ones.

DETAILED DESCRIPTION OF THE INVENTION

Next, the invention will be described in greater detail by referring to a preferred mode for carrying out the same.

First, the definitions of the individual symbols in the formulae employed herein will be described.

Z represents a residue of a compound having 2 to 10 hydroxyl groups which may have a linear, branched or cyclic structure.

The term "a residue of a compound having 2 to 10 hydroxyl groups" as used herein means a group consisting of the remainder of all of the groups substituting the hydroxyl groups of the compounds (the parenthetical parts k1, k2 and k3).

Examples of the compound having 2 to 10 hydroxyl group include a polyglycerol compound such as diglycerol, triglycerol, tetraglycerol, pentaglycerol, hexaglycerol, heptaglycerol and octaglycerol, a dihydric alcohol such as ethylene glycol, a trihydric alcohol such as glycerol, and a tetrahydric alcohol such as pentaerythritol. Among all, an alcohol having 2 to 8 hydroxyl groups is preferable and diglycerol, triglycerol, ethylene glycol, glycerol or pentaerythritol is more preferable.

Y, which is a group for linking X, may be a single bond. In this case, X directly attaches to the AO group.

Alternatively, Y may be a group selected from among an alkylene group having 1 to 6 carbon atoms, —C(=O)—, —C(=O)O—, —C(=O)(CH$_2$)$_p$—, —C(=O)(CH$_2$)$_q$C(=O)O—, —(CH$_2$)$_2$NHC(=O)(CH$_2$)$_2$— and —(CH$_2$)$_3$NHC(=O)(CH$_2$)$_2$—. Examples of the alkylene group having 1 to 6 carbon atoms include a methylene group, an ethylene group, an isopropylene group, a trimethylene group, an isobutylene group, a cyclobutylene group, a tetraraethylene group, a pentamethylene group, a cyclopentylene group, a hexamethylene group and a cyclohexylene group which may have a linear, branched or cyclic structure. Among all, an alkylene group having 1 to 3 carbon atoms such as a methylene group, an ethylene group, an isopropylene group or a trimethylene group is preferable.

In the case where Y is a —C(=O)(CH$_2$)$_p$— group, p satisfies the range of 1≤p≤5, preferably 1≤p≤2. In the case where Y is a —C(=O)(CH$_2$)$_q$C(=O)C— group, q satisfies the range of 2≤q≤3.

It is preferable that Y is a methylene group, an ethylene group, an isopropylene group, a trimethylene group, —(CH$_2$)$_2$NHC(=O)(CH$_2$)$_2$—, —(CH$_2$)$_2$NHC(=O)(CH$_2$)$_2$— or —C(=O)(CH$_2$)$_q$C(=O)O—.

X represents a group selected from among a carboxyl group, a maleimide group, a t-butoxycarbonylamino group and a 3,3-diethoxypropoxy group. Among all, a carboxyl group or a maleimide group is preferable. It is not preferable that X is a hydroxyl group, an amino group or a thiol group, since such a compound reacts with a compound represented by one of the formulae (I) to (IV).

R represents a hydrocarbon group having 1 to 6 carbon atoms. Examples of such a hydrocarbon group include a methyl group, an ethyl group, a propyl group, an isopropyl group, a butyl group, an isobutyl group, a sec-butyl group, a tert-butyl group, a pentyl group, a hexyl group, a cyclopropyl group, a cyclobutyl group, a cyclopentyl group and a cyclohexyl group which may have a linear, branched or cyclic structure. Among all, an alkyl group having 1 to 4 carbon atoms such as a methyl group, an ethyl group or a tert-butyl group is preferable and a methyl group is particularly preferable.

AO represents an oxyalkylene group having 2 to 4 carbon atoms. Examples thereof include an oxyethylene group, an oxypropylene group, an oxytrimethylene group and an oxybutylene group which may have a linear or branched structure. Among all, an oxyalkylene group having 2 or 3 carbon atoms such as an oxyethylene group or an oxypropylene group is preferable and an oxyethylene group is particularly preferable.

The oxyalkylene groups constituting a polyoxyalkylene group represented by (AO)$_{m1\ to\ 3}$ may be either of a single kind or a combination of oxyalkylene groups of two or more kinds. In the case where oxyalkylene groups of two or more kinds are combined, the combination type is not particularly restricted. Namely, the polyoxyalkylene group may be in a block or random structure. When the oxyethylene content based on the total oxyalkylene groups is low, the water solubility of the compound is sometimes lowered. It is therefore preferable to control the oxyethylene content based on the total oxyalkylene groups to 50 to 100% by mol.

m1 and m2 are each independently 5 to 2000, preferably 30 to 1000. m3 is 0 to 2000, preferably 0 to 1500. m1, m2 and m3 each stands for the average mole number of the attached alkylene oxide.

a and b respectively satisfy the ranges of 1≤a≤500 and 0≤b≤500, preferably 1≤a≤300 and 0≤b≤300 and more preferably 1≤a≤50 and 0≤b≤50.

It is preferable that [—C(=O)(CH$_2$)$_{n1}$O(CH$_2$CH$_2$O)$_{n2}$—] and [—C(=O)CH(CH3)O—] are bonded together to form a block structure.

In the case where b is 0, the compound has a terminal secondary hydroxyl group. However, this terminal secondary hydroxyl group hardly reacts, which makes it difficult to introduce a desired functional group. The invention is advantageous in that a desired functional group can be introduced even in such a case.

n1 and n2 respectively satisfy the ranges of 1≤n1≤5 and 0≤n≤1. In the case where n2 is 0, it is preferable that n1 is 1 or 5. In the case where n1 is 0, it is preferable that n2 is 1.

k1, k2 and k3 respectively satisfy the ranges of 0≤k1≤8, 0≤k2≤8 and 1≤k3≤10 and 2≤k1+k2+k3≤10. It is preferable that k1, k2 and k3 respectively satisfy the ranges of 1≤k1≤4, 0≤k2≤4 and 1≤k3≤8. It is also preferable that k1+k2+k3 satisfies the range of 2≤k1+k2+k3≤8, more preferably 2≤k1+k2+k3≤4.

In the case where a crosslinked polymer is formed via, for example, the gelation of the compound (2) according to the invention and employed in a drug release device, a suture thread/bone-fixing agent, a hemostatic agent, a tissue adhesion inhibitor and so on, use is preferably made of a compound wherein k1 and k2 are 0 and k3 satisfies the range of 2≤k3≤10, more preferably 4≤k3≤8. In this case, it is more preferable that a and b satisfy respectively the ranges of 1≤a≤300, 0≤b≤300 and 2≤a+b≤300, more preferably 1≤a≤50, 0≤b≤50 and 4≤a+b≤50.

In the case of using the compound (2) according to the invention as a polymer to be used for enhancing the drug retention in the blood and sustainedly releasing the drug at a target site, use is preferably made of a compound wherein k1, k2 and k3 satisfy respectively the ranges of 1≤k1≤4, 1≤k2≤4 and 1≤k3≤2, more preferably 2≤k1≤4, 2≤k2≤4 and 1≤k3≤2, and more preferably k1=2, k2=2 and k3=1. In this case, it is more preferable that a and b satisfy respectively the ranges of 1≤a≤9 and 0≤b≤9, more preferably 1≤a≤5 and b=0.

$E^1$ and $E^2$ represent each —(CH$_2$)$_r$Q$^2$ or $E^1$ and $E^2$ together form an alkylene group. As the halogen atom $Q^2$, an iodine atom, a bromine atom or a chlorine atom is preferable and a bromine atom or a chlorine atom is more preferable. r is 1 to 5, and preferably 1 to 3.

As the alkylene group formed by $E^1$ and $E^2$ together, an alkylene group having 1 to 5 carbon atoms is preferable. Specific examples thereof include a linear or branched alkylene group such as a methylene group, an ethylene group, a trimethylene group, an isopropylene group, a butylene group, an isobutylene group and a 1,1'-dimethylethylene group. Among all, an alkylene group having 1 to 3 carbon atoms such as an ethylene group, a trimethylene group or an isopropylene group is preferable.

As a preferable example of a compound having such an alkylene group, a compound represented by the following formula (I-1) (wherein t it 1 to 2) may be cited. Specific examples thereof include succinic anhydride represented by the following formula (I-2) and glutaric anhydride represented by the following formula (I-3).

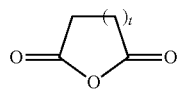
(I-1)

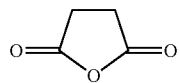
(I-2)

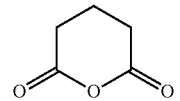
(I-3)

$P^1$ represents a group selected from among a vinyl group, a 2-propenyl group, a p-nitrophenoxy group, a pentafluorophenoxy groups a benzotriazoloxy group, a succinimidyloxy group and $—(CH_2)_rQ^2$. Among all, a 2-propenyl group, a vinyl group, a p-nitrophenoxy group or a succinimidyloxy group is preferable. A benzotriazoloxy group is a group represented by the following formula ($P^1$-1) while a succinimidyloxy group is a group represented by the following formula ($P^1$-2). The meanings of the symbols in $—(CH_2)_rQ^2$ are each as defined above.

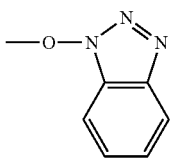
($P^1$-1)

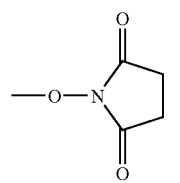
($P^1$-2)

$Q^1$ represents a halogen atom. As $Q^1$, an iodine atom, a bromine atom or a chlorine atom is preferable and a bromine atom or a chlorine atom is more preferable.

G represents a residue originating in a compound represented by one of the above-described formulae (I) to (IV) and examples thereof include groups represented by the following formulae (i) to (iv). The formulae (i) to (iv) show groups which correspond respectively to the compounds (I) to (IV). In the case where k3 satisfies the range 2≤k3, at least one G may be a hydrogen atom. However, it is preferable that each of Gs represents a residue originating in one of the compounds (I) to (IV).

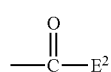
(i)

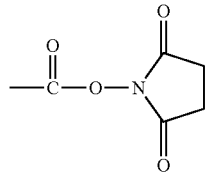
(ii)

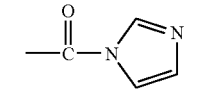
(iii)

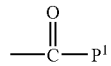
(iv)

As an example of the residue originating in the compound (I-1), a group represented by the following formula (i-1) may be cited. In this formula, t is as defined above,

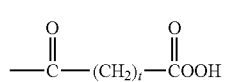
(i-1)

Next, the production method according to the invention will be illustrated.

The compound (1) to be used in the production method according to the invention is a random copolymer or a block copolymer in which a monomer such as 3,6-dimethyl-1,4-dioxane-2,5-dione, caprolactone, 1,4-dioxane-2,5-dione or 1,4-dioxane-2-one is added to hydroxyl groups of, for example, polyoxyethylene. In the case where the compound (1) is a random copolymer, it has a primary hydroxyl group or a secondary hydroxyl group at the terminus of the molecular chain having a biodegradable site. That is, it is a mixture of compounds terminated with a primary hydroxyl group or a secondary hydroxyl group. The biodegradable site of the compound (1) is at least one member selected from among polylactide, polyglycolide, polycaprolactone and polyhydroxybutyric acid.

The compound (1) can be produced by a publicly known method. In the case where the compound (1) is a polyoxyalkylene-polylactide derivative or a polyoxyalkylene-caprolactone derivative, for example, it can be produced by polymerizing a polyoxyalkylene derivative with a monomer such as 3,6-dimethyl-1,4-dioxane-2,5-dione or caprolactone in an organic solvent in the presence of tin octylate (tin 2-ethylhexanoate) followed by crystal precipitation or the like.

In the invention, the compound (1) is reacted with one of the compounds (I) to (IV) in the presence of an alkaline solid salt. In this case, all of these compounds may be added and reacted together. However, it is preferable that one of the compounds (I) to (IV) is added to the compound (1) in the presence of an alkaline solid salt and reacted. It is desirable to sufficiently dehydrate the compound (1) prior to the reaction.

An alkaline solid salt means a compound which serves as a catalyst and the aqueous solution of which prepared by dissolving it in water shows a pH value within the alkaline range. An arbitrary alkaline solid salt may be used herein without specific restriction, so long as it would not cleave the bond at the biodegradable site such as lactide or caprolactone in the compound (1) during the reaction. Use is made of an alkaline solid salt the aqueous solution of which prepared by dissolving it in water has a pH value of preferably from 7.1 to 13, more preferably from pH 7.1 to 11.

Specific examples thereof include carbonate, hydrogencarbonate, phosphate and acetate of an alkali metal. More specifically, examples thereof include sodium carbonate, sodium hydrogen carbonater potassium carbonate, sodium hydrogen phosphate, disodium hydrogen phosphate, potassium hydrogen phosphate, dipotassium hydrogen phosphate, potassium hydrogen carbonate and potassium acetate. Among all, potassium carbonate or potassium acetate are preferable and potassium carbonate is more preferable.

It is not preferable to use potassium phosphate or sodium phosphate as the catalyst. This is because the biodegradable site of the compound (1) is cleaved in this case. In the case of using sodium hydrogen phosphate, it is feared that the reaction proceeds only insufficiently and thus the reaction ratio is lowered. In the case of using metallic sodium, metallic lithium, sodium hydride, potassium hydride, calcium hydride or potassium t-butoxide, the reaction occurs when the molar ratio of the mole number of such a catalyst to the mole number of the hydroxyl groups in the compound (1) is 1:1. However, the reaction ratio is lowered. It is undesirable that the mole number of such a catalyst employed exceeds the mole number of the hydroxyl groups in the compound (1). This is because the biodegradable site of the compound (1) is cleaved in this case due to the excessively strong alkalinity.

It is preferable to use the alkaline solid salt in an amount of 0.1 to 1000 times by mole as much as the total hydroxyl equivalent, namely, "number of hydroxyl groups per mole of compound (1)×mole number of compound (1)". To facilitate stirring during the reaction, it is preferable that the amount thereof is not more than 1000 times by mole, more preferably from 1 to 300 times by mole and more preferably from 1 to 50 times by mole.

It is preferable that the compound (1) and one of the compounds (I) to (IV) are fed in such a manner that one of the compounds (I) to (IV) is in excess. This is because the unreacted matter can be conveniently removed in the purification step as will be described hereinafter in the case where one of the compounds (I) to (IV) is fed in excess. In the case where the compound (1) is fed in excess, the remaining unreacted compound (1) can be hardly removed by recrystallization, crystal precipitation or the like.

From this viewpoint, the compound (1) and one of the compounds (I) to (IV) are fed at a molar ratio of preferably from 1 to 100 times by mole, more preferably from 1.1 to 50 times by mol and more preferably from 1.1 to 30 times by mole based on the total hydroxyl equivalent, namely, "number of hydroxyl groups per mole of compound (1)×mole number of compound (1)".

As the compounds (I) to (IV), use may be preferably made of a (meth)acryloyl halide, succinic anhydride represented by the above formula (I-2), glutaric anhydride represented by the above formula (I-3), disuccinimidyl carbonate represented by the above formula (II) and N,N'-carbonyldiimidazole represented by the above formula (III).

The above-described reaction can be performed in the presence of an organic solvent. An arbitrary organic solvent can be used without specific restriction, so long as it has no functional group (for example, a hydroxyl group) capable of reacting with the compounds (I) to (IV) (for example, an alcohol such as ethanol or methanol). Examples of such an organic solvent include an ester (for example, an acetic acid ester such as ethyl acetate), a halogenated solvent (for example, dichloromethane or chloroform), and a hydrocarbon (for example, an aromatic hydrocarbon such as benzene, toluene or xylene). Among all, a hydrocarbon such as toluene or xylene is preferable and toluene is more preferable. Although a halogenated solvent such as dichloromethane has no problem in reactivity, it is not preferable from the viewpoint of handling because of the low boiling point thereof.

It is preferable to use the solvent in an amount of from 0.1 to 100 times by weight, more preferably from 1 to 20 times by weight, as much as the compound (1).

The reaction temperature ranges from 20 to 140° C., preferably from 30 to 120° C. The reaction time is 1 hour or longer, preferably from 2 to 100 hours and more preferably from 2 to 50 hours.

Thus the compound (1) can be bonded to one of the compounds (I) to (IV) to thereby form the compound (2) having the desired functional group introduced thereinto.

After the completion of the reaction, the purification step is carried out. In this step, namely, the alkaline solid salt is filtered off from the liquid reaction mixture and then the filtrate is concentrated or crystallized by pouring into a poor solvent or the like. Thus, the alkaline solid salt can be easily removed from the liquid reaction mixture by filtration and the compound (2) can be obtained at a high purity and a high yield.

The filter to be used in the filtration is not particularly restricted, so long as the insoluble matters can be removed thereby from the liquor to be treated. In usual, use can be made of filters made of various materials such as paper or glass having a retention particle size of 1 to 10 μm and being resistant to the solvent. The filtration method is not particularly restricted. For example, it is possible to employ vacuum filtration, pressure filtration, centrifugal filtration or the like.

Although crystallization can be performed merely by cooling the obtained filtrate, it is feared that the compound (2) is not sufficiently crystallized but remains in some solvent, thereby lowering the yield. Therefore, sufficient crystallization can be achieved by cooling the solvent preferably to 10° C. or lower with the use of a poor solvent and thus crystals can be obtained at a high yield. Alternatively, crystallization may be performed by removing the organic solvent by, for example, distillation. It necessary, it is also possible to conduct recrystallization, reprecipitation, crystal precipitation or the like.

As an organic solvent to be used in the crystallization, it is preferable to employ a solvent in which the target compound (2) is soluble but one of the compounds (I) to (IV) present in excess is insoluble or hardly soluble. Examples of such an organic solvent include ethyl acetate, acetone, dimethylformamide, dimethyl sulfoxide, toluene, chloroform and acetonitrile which are good solvents for the compound (2).

In the crystallization from such a good solvent, the dissolution temperature is preferably 0 to 120° C., more preferably 20 to 70° C.

It is preferable to use the organic solvent in an amount of from 1 to 100 times by weights more preferably from 2 to 50 times by weight, as much as the crystals.

The crystallization may be carried out by dissolving the filtrate in a good solvent alone and then cooling. Alternatively, a poor solvent may be added thereto followed by crystallization. In the case where the filtrate is dissolved in a good solvent and then a poor solvent is added thereto followed by crystallization, it is preferable to employ such a solvent ratio that the target compound (2) alone can be crystallized while one of the compounds (I) to (IV) remaining unreacted is still dissolved in the solvent mixture. The solvent ratio can be appropriately selected depending on the solvents employed.

As specific examples of the crystallization method, there can be enumerated the following methods.

(A) The liquid reaction mixture is filtered so as to remove the alkaline solid salt. Then, the target compound (2) is precipitated either by cooling the residual solution as such or by adding at least one solvent (i.e., a good solvent such as ethyl acetate, acetone or toluene) to dissolve the solution remaining after the filtration and then cooling.

In this method, however, it is observed that the compound (2) is not sufficiently crystallized in some solvent or in the case where the compound (1) has a molecular weight of 3,000 or less.

(B) The liquid reaction mixture is filtered so as to remove the alkaline solid salt. Then, crystals of the target compound (2) are precipitated by adding a poor solvent (an ether or an aliphatic hydrocarbon solvent having 5 to 8 carbon atoms) to the solution remaining after the filtration. Alternatively, crystals of the target compound (2) are precipitated by adding a good solvent such as ethyl acetate, acetone or toluene to dissolve the solution remaining after the filtration and then using a poor solvent such as an ether or an aliphatic hydrocarbon solvent having 5 to 8 carbon atoms (C) The liquid reaction mixture is filtered so as to remove the alkaline solid salt. Then, crystals of the target compound (2) are precipitated either by dissolving the solution by using a poor solvent such as an ether or an aliphatic hydrocarbon solvent having 5 to 8 carbon atoms in such an amount that the target compound (2) is not precipitated followed by cooling, or by adding at least one good solvent such as ethyl acetate, acetone or toluene to the solution remaining after the filtration, dissolving the solution by the combined use of a poor solvent such as an ether or an aliphatic hydrocarbon solvent having 5 to 8 carbon atoms in such an amount that the target compound (2) is not precipitated followed by cooling.

As described above, the molecular weight of the compound (1), one of the methods (A) to (C) as described above suitable for the compounds (I) to (IV) to be used and the kind of the solvent, the temperature and so on can be appropriately selected to obtain the target compound (2) at a high purity and a high yield.

The aliphatic hydrocarbon solvent having 5 to 8 carbon atoms to be used as a poor solvent is not particularly restricted. For example, use can be made of pentane, isopentane, neopentane, hexane, isohexane, 3-methylpentane, neohexane, 2,3-dimethylbutane, heptane, 2-methylhexane, 3-methylhexane, 3-ethylpentane, 2,2-dimethylpentane, 2,3-dimethylpentane, 3,3-dimethylpentane, 2,3,3-trimethylbutane, octane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2-methyl-3-ethylpentane, 3-methyl-3-ethylpentane, 2,2,3-trimethylpentane, 2,2,-4-trimethylpentane, 2,2,3,3-tetramethylbutane or the like. Among all, hexane or heptane is preferable therefor.

The active group G in the compound (2) having been produced by the method according to the invention can be further converted into a functional group by using a publicly known method. For example, a G group terminated with a carboxylic acid can be converted into N-hydroxysuccinimide by using N-hydroxysuccinimide and DCC (1,1'-dicyclohexylcarbodiimide). Moreover, it can be reacted with a compound having an amino group.

By such conversion into a functional group as described above, the G group in the compound (2) can be converted into a compound terminated with a thiol group, an amino group, an acetal group, an aldehyde group or the like.

The compound (2) produced by the method according to the invention and its derivative can form a crosslinked polymer via, for example, gelation. Therefore, they are usable in a drug release device, a suture thread/bone-fixing agent, a hemostatic agent, a tissue adhesion inhibitor and so on in the clinical field.

These polymers are also usable for enhancing the drug retention in the blood and sustainedly releasing the drug at a target site.

EXAMPLES

Now, the invention will be described in greater detail by referring to the following Examples. However, it is to be understood that the invention is not restricted thereto.

Production Example 1

Into a 3-1 four-necked flask, methoxypolyethylene glycol (450 g, 0.0225 mol. SUNBRIGHT MEH-20T (manufactured by NOF CORPORATION: molecular weight 20000)) and toluene (1200 g) were introduced and stirred therein. After heating to 110° C., the mixture was dehydrated (50 g of toluene was distilled off). After cooling to 90° C., tin 2-ethylhexanoate (0.81 g) dissolved in dry toluene (9 g) and 3,6-dimethyl-1,4-dioxane-2,5-dione (9.73 g, 0.0675 mol) were successively added thereto. Then, the mixture was heated to 110° C. and reacted for 6 hours.

After the completion of the reaction, the reaction mixture was cooled to 40° C. and ethyl acetate (1070 ml) and hexane (1500 ml) were added to thereby precipitate crystals. After filtering the crystals, hexane (1500 ml) was added followed by stirring. The crystals were filtered and dried under reduced pressure to give methoxypolyethylene glycol-polylactide (trimer) (448 g).

$^1$H-NMR (CDCl$_3$, 400 MHz)

δ 1.45-1.61 (m, —CH(C$\underline{H}_3$)O—), 3.38 (s, —OC$\underline{H}_3$), 3.40-3.90 (m, —(C$\underline{H}_2$C$\underline{H}_2$O)$_n$—), 4.20-4.40 (m, —C$\underline{H}_2$OC(=O)—), 5.08-5.23 (m, —C$\underline{H}$(CH$_3$)O—)

Production Example 2

Into a 3-1 four-necked flask, pentaerythritol polyethylene glycol (300 g, 0.03 mol; SUNBRIGHT PTE-10000 (manufactured by NOF CORPORATION: molecular weight 10000)) and toluene (900 g) were introduced and stirred therein. After heating to 110° C. the mixture was dehydrated (100 g of toluene was distilled off). After cooling to 90° C., tin 2-ethylhexanoate (4.32 g) dissolved in dry toluene (20 g) and 3,6-dimethyl-1,4-dioxane-2,5-dione (58438 g, 0.405 mol) were successively added thereto. Then, the mixture was heated to 110° C. and reacted for 10 hours.

After the completion of the reaction, the reaction mixture was cooled to 40° C. and ethyl acetate (900 ml) and hexane (2700 ml) were added to thereby precipitate crystals. After filtering the crystals, hexane (2700 ml) was added followed by stirring. The crystals were filtered and dried under reduced pressure to give pentaerythratol polyethylene glycol-polylactide (tetramer) (305.7 g).

$^1$H-NMR (CDCl$_3$, 400 MHz)

δ 1.45-1.61 (m, —CH(C$\underline{H}_3$)O—), 3.40-3.90 (m, —(C$\underline{H}_2$CH$_2$O)$_n$—), 4.20-4.40 (m, —C$\underline{H}_2$OC(=O)—), 5.08-5.23 (m, —C$\underline{H}$(CH$_3$)O—)

Example 1

Into a 500-ml four-necked flask, methoxypolyethylene glycol-polylactide (30 g, 0.0015 mol) obtained in Production Example 1 and toluene (200 g) were introduced and stirred therein. After heating to 110° C., the mixture was dehydrated (37 g of toluene was distilled off). After cooling to 60° C., glutaric anhydride (1.53 g, 0.0134 mol) and potassium carbonate (3.1 g, 0.0225 mol) were added thereto. Then, the mixture was reacted at 60° C. for 27 hours.

After the completion of the reaction, the insoluble matters were filtered. After cooling to 40° C., ethyl acetate (100 ml) and hexane (350 ml) were added to thereby precipitate crystals. After filtering the crystals, 2-propanol (700 ml) was added and recrystallization was performed. After filtering the crystals, recrystallization was further repeated once. Next, the crystals were filtered, washed with hexane (700 ml) and filtered. The crystals were dried under reduced pressure to give methoxypolyethylene glycol-polylactide (trimer)-glutarate (26.7 g).

$^1$H-NMR (CDCl$_3$, 400 MHz)

δ 1.45-1.61 (m, —CH(CH$_3$)O—), 1.97 (—COCH$_2$CH$_2$CH$_2$CO—, quint), 2.47 (=COCH$_2$CH$_2$CH$_2$CO—, m) 3.38 (s, —OCH$_3$), 3.40-3.90 (m, —(CH$_2$CH$_2$O)$_n$—), 4.20-4.40 (m, =CH$_2$OC(=O)—), 5.08-5.23 (m, —CH(CH$_3$)O—)

Example 2

Into a 500-ml four-necked flask, methoxypolybthylene glycol-polylactide (30 g, 0.0015 mol) obtained in Production Example 1 and toluene (200 g) were introduced and stirred therein. After heating to 110° C. the mixture was dehydrated (41 g of toluene was distilled off). After cooling to 60° C., potassium carbonate (8.3 g, 0.06 mol) was added and then acrylic acid chloride (1.4 g, 0.015 mol) was dropped thereto. Then, the mixture was reacted for 18 hours.

After the completion of the reaction, the reaction mixture was filtered. After cooling to 40° C., ethyl acetate (100 ml) and hexane (350 ml) were added to thereby precipitate crystals. After filtering the crystals, 2-propanol (600 ml) was added and recrystallization was performed. After filtering the crystals, recrystallization was further repeated once. Next, the crystals were filtered, washed with hexane (600 ml) and filtered. The crystals were dried under reduced pressure to give methoxypolyethylene glycol-polylactide (trimer)-acrylate (25.5 g).

$^1$H-NMR (CDCl$_3$, 400 MHz)

δ 1.45-1.61 (m, —CH(CH$_3$)O—), 3.38 (s, —OCH$_3$), 3.40-3.90 (m, —(CH$_2$CH$_2$O)$_n$—), 4.20-4.40 (m, —CH$_2$OC(=O)—), 5.08-5.23 (m, —CH(CH$_3$)O—), 5.80-6.50 (—CH$_2$=CH—, 3H)

Example 3

Into a 500-ml four-necked flask, pentaerythritol polyethylene glycol-polylactide (50.0 g, 0.0043 mol) obtained in Production Example 2 and toluene (300 g) were introduced and stirred therein. After heating to 110° C., the mixture was dehydrated (40 g of toluene was distilled off). After cooling to 60° C., glutaric anhydride (29.2 g, 0.256 mol) and potassium carbonate (47.1 g, 0.341 mol) were added thereto. Then, the mixture was reacted at 60° C. for 16.5 hours. Further, glutaric anhydride (19.5 g) and potassium carbonate (31.4 g) were added thereto and the reaction was performed for 8 hours.

After the completion of the reaction, the insoluble matters were filtered. After cooling to 40° C., ethyl acetate (550 ml) and hexane (300 ml) were added to thereby precipitate crystals. After filtering the crystals and dissolving in ethyl acetate (650 ml), hexane (300 ml) was added and the crystals were precipitated. After filtering the crystals and similarly dissolving in ethyl acetate (650 ml), insoluble matters were observed. Thus, the mixture was filtered through a 5A paper filter GF75 and hexane (600 ml) was added to precipitate the crystals. The crystals were washed with hexane (600 ml) and filtered. The crystals were dried under reduced pressure to give pentaerythritol polyethylene glycol-polylactide (tetramer)-tetraglutarate (41.0 g).

$^1$H-NMR (CDCl$_3$, 400 MHz)

δ 1.45-1.61 (m, —CH(CH$_3$)O—), 1.97 (—COCH$_2$CH$_2$CH$_2$CO—, quint), 2.47 (=COCH$_2$CH$_2$CH$_2$CO—, m), 3.38 (s, —OCH$_3$), 3.40-3.90 (m, —(CH$_2$CH$_2$O)$_n$—), 4.20-4.40 (m, =CH$_2$OC(=O)—), 5.08-5.23 (m, —CH(CH$_3$)O—)

Comparative Example 1

Into a 500-ml four-necked flask, methoxypolyethylene glycol-polylactide (30 g, 0.0015 mol) obtained in Production Example 1 and methylene chloride (150 g) were introduced and stirred for dissolutions. After dissolving, the solution was cooled to 0° C. Then, triethylamine (0.40 g 0.0039 mol) and glutaric anhydride (0.26 g, 0.00225 mol) were successively added and the reaction was performed at 0° C. for 12 hours. Further, triethylamine (4.0 g) and glutaric anhydride (2.6 g) were successively added and the reaction was conducted for 12 hours. After filtering the insoluble matters, diethyl ether (300 ml) was added to precipitate the crystals. The crystals were filtered and dried under reduced pressure (27.2 g).

Comparative Example 2

Into a 500-ml four-necked flask, pentaerythritol polyethylene glycol-polylactide (50.0 g, 0.0043 mol) obtained in Production Example 2 and methylene chloride (250 g) were introduced and stirred for dissolution. After dissolving, the solution was cooled to 0° C. Then, triethylamine (4.52 g, 0.0447 mol) and acryloyl chloride (2.34 g, 0.0258 mol) were successively added and the reaction was performed at 0° C. for 12 hours.

After the completion of the reaction, triethylamine hydrochloride was filtered and diethyl ether (500 ml) was added to precipitate the crystals. Next, the crystals were filtered and dried under reduced pressure to give pentaerythritol polyethylene glycol-polylactide (tetramer)-tetraacrylate (45.1 g)

$^1$H-NMR (CDCl$_3$, 400 MHz)

δ 1.45-1.61 (m, —CH(CH$_3$)O—), 3.38 (s, —OCH$_3$), 3.40-3.90 (m, —(CH$_2$CH$_2$O)$_n$—), 4.20-4.40 (m, —CH$_2$OC(=O)—), 5.08-5.23 (m, —CH(CH$_3$)O—), 5.80-6.50 (—CH$_2$=CH—, 3H)

Comparative Example 3

Into a 500-ml four-necked flask, pentaerythritol polyethylene glycol-polylactide (50.0 g, 0.0043 mol) obtained in Production Example 2 and methylene chloride (250 g) were introduced and stirred for dissolution. After dissolving, the solution was cooled to 0° C. Then, triethylamine (4.52 g, 0.0447 mol) and p-nitrophenyl chloroformate (5.20 g, 0.0258 mol) were successively added and the reaction was performed at 0° C. for 12 hours.

After the completion of the reaction, triethylamine hydrochloride was filtered and diethyl ether (500 ml) was added to precipitate the crystals. Next, the crystals were filtered and dried under reduced pressure to give pentaerythritol polyethylene glycol-polylactide (tetramer)-tetra-p-nitrophenyl carbonate (45.1 g).

$^1$H-NMR (CDCl$_3$, 400 MHz)

δ 1.45-1.61 (m, —CH(CH$_3$)O—), 3.38 (s, —OCH$_3$), 3.40-3.90 (m, —(CH$_2$CH$_2$O)$_n$—), 4.20-4.40 (m, —CH$_2$OC(=O)—), 5.08-5.23 (m, —CH(CH$_3$)O—), 7.39, 8.25 (m, —C=CH—CH—C(NO$_2$)CH=CH—)

Next, the compounds finally obtained in Examples 1 to 3 and Comparative Examples 1 to 3 were subjected to $^1$H-NMR measurement. As a result, it was clarified that the target compounds were obtained in Examples 1 to 3. In Comparative Example 1, the peaks assignable to glutaric acid, i.e., δ 1.97 (—COCH$_2$CH$_2$CH$_2$CO—, quint) and 2.47 (—COCH$_2$CH$_2$CH$_2$CO—, m) were not observed, which indicated that the target compound was not obtained.

In Comparative Examples 2 and 3, on the other hand, it was confirmed that the target compounds were obtained due to the peak assignable to acryloyl group (δ5.80-6.50 (—CH$_2$=CH—, 3H) and the peaks assignable to the ortho- and meta-positions (δ 7.39 (m) and 8.25 (m)). However, the peaks δ 1.43 (t) and δ 3.16 (q) indicated that triethylamine hydrochloride remained therein.

Next, the filtration time was measured using the products of Examples 1 to 3 and Comparative Examples 2 and 3. In the filtration, use was made of a Buchner funnel (diameter: 110 mm) and a 5A paper filter (manufactured by ADVANTEC). Table 1 summarizes the results of the measurement of the filtration speed of each product.

TABLE 1

| | Filtration speed (min) |
|---|---|
| Example 1 | 0.3 |
| Example 2 | 0.4 |
| Example 3 | 0.8 |
| Comp. Example 2 | >15.0 (solidified during filtration) |
| Comp. Example 3 | >15.0 (solidified during filtration) |

As Table 1 shows, each of the products of Examples 1 to 3 showed a filtration time of around 1 min, i.e., favorable filtration properties even in the case of using the 5A paper filter alone. In contrast thereto, the products of Comparative Examples 2 and 3 solidified on the filter surface because of the slow filtration and filtration could not be completed even after 15 min.

In Comparative Examples 2 and 3, therefore, triethylamine hydrochloride caused jamming and thus the filtration proceeded extremely slowly, compared with Examples 1 to 3 according to the invention wherein the alkali solid salt was employed.

This application is based on Japanese Patent application JP 2006-269943, filed Sep. 29, 2006, the entire content of which is hereby incorporated by reference, the same as if fully set forth herein.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A method for producing a biodegradable polyoxyalkylene derivative, which comprises: reacting a biodegradable polyoxyalkylene compound represented by the following formula (1):

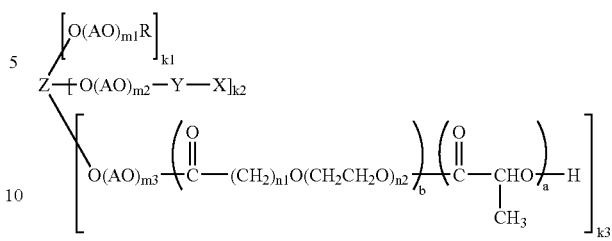

wherein Z represents a residue of a compound having from 2 to 10 hydroxyl groups;
Y represents a single bond or a group selected from the group consisting of an alkylene group having from 1 to 6 carbon atoms, —C(=O)—, —C(=O)O—, —C(=O)(CH$_2$)$_p$—, in which p is from 1 to 5, —C(=O)(CH$_2$)$_q$C(=O)O—, in which q is 2 or 3, —(CH$_2$)$_2$NHC(=O)(CH$_2$)$_2$— and —(CH$_2$)$_3$NHC(=O)(CH$_2$)$_2$—;
X represents a group selected from the group consisting of a carboxyl group, a maleimide group, a t-butoxycarbonylamino group and a 3,3-diethoxypropoxy group;
R represents a hydrocarbon group having from 1 to 6 carbon atoms;
AO represents an oxyalkylene group having from 2 to 4 carbon atoms;
a is from 1 to 500, and b is from 0 to 500;
m1 and m2 are each independently from 5 to 2000;
m3 is from 0 to 2000;
n1 is from 1 to 5, and n2 is from 0 to 1; and
k1 is from 0 to 8, k2 is from 0 to 8 and k3 is from 1 to 10, k1, k2 and k3 satisfy a relationship, 2≤k1+k2+k3≤10;
with a compound represented by the following formula (I-1) in the presence of potassium carbonate;

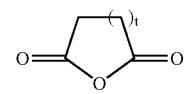

wherein t is from 1 to 2;
the biodegradable polyoxyalkylene derivative being represented by the following formula (2):

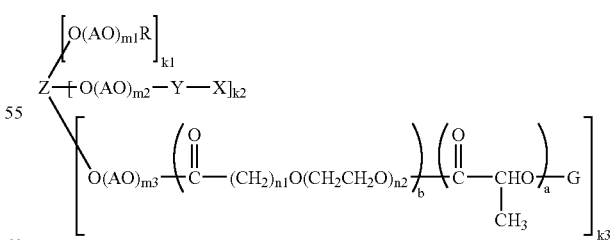

wherein Z represents a residue of a compound having from 2 to 10 hydroxyl groups;
Y represents a single bond or a group selected from the group consisting of an alkylene group having from 1 to 6 carbon atoms, —C(=O)—, —C(=O)O—, —C(=O)(CH$_2$)$_p$—, in which p is from 1 to 5, —C(=O)(CH$_2$)$_q$C (=O)O—, in which q is 2 or 3, —(CH$_2$)$_2$NHC(=O)(CH$_2$)$_2$— and —(CH$_2$)$_3$NHC(=O)(CH$_2$)$_2$—;

X represents a group selected from the group consisting of a carboxyl group, a maleimide group, a t-butoxycarbonylamino group and a 3,3-diethoxypropoxy group;

R represents a hydrocarbon group having from 1 to 6 carbon atoms;

AO represents an oxyalkylene group having from 2 to 4 carbon atoms;

a is from 1 to 500, and b is from 0 to 500;

m1 and m2 are each independently from 5 to 2000;

m3 is from 0 to 2000;

n1 is from 1 to 5, and n2 is from 0 to 1; and k1 is from 0 to 8, k2 is from 0 to 8 and k3 is from 1 to 10, k1, k2 and k3 satisfy a relationship, $2 \leq k1+k2+k3 \leq 10$; and G represents a residue originating in a compound represented by the formula (I-1), provided that in a case where k3 is 2 or more, at least one G may be a hydrogen atom.

2. The method according to claim 1, wherein a is from 1 to 300, and b is 0.

3. The method according to claim 1, wherein k1 is 0.

4. The method according to claim 1, wherein k2 is 0.

5. The method according to claim 3, wherein k2 is 0.

6. The method according to claim 4, wherein k1 is from 1 to 4, and k3 is from 1 to 2.

7. The method according to claim 1, wherein k1 is from 1 to 4, and k3 is from 1 to 2.

\* \* \* \* \*